United States Patent
Mittal et al.

(10) Patent No.: US 11,693,881 B2
(45) Date of Patent: Jul. 4, 2023

(54) FREE WORLD REPLICATION PROTOCOL FOR KEY-VALUE STORE

(71) Applicant: eBay Inc., San Jose, CA (US)

(72) Inventors: Rishabh Mittal, San Jose, CA (US); Harihara Kadayam, Fremont, CA (US)

(73) Assignee: eBay Inc., San Jose, CA (US)

( * ) Notice: Subject to any disclaimer, the term of this patent is extended or adjusted under 35 U.S.C. 154(b) by 60 days.

(21) Appl. No.: 17/360,017

(22) Filed: Jun. 28, 2021

(65) Prior Publication Data

US 2021/0326355 A1    Oct. 21, 2021

Related U.S. Application Data

(63) Continuation of application No. 16/210,948, filed on Dec. 5, 2018, now Pat. No. 11,055,313.

(51) Int. Cl.

| | |
|---|---|
| *G06F 16/00* | (2019.01) |
| *G06F 16/27* | (2019.01) |
| *G06F 16/22* | (2019.01) |
| *G06F 16/23* | (2019.01) |
| *G06F 9/54* | (2006.01) |

(52) U.S. Cl.
CPC .............. *G06F 16/27* (2019.01); *G06F 9/546* (2013.01); *G06F 16/2237* (2019.01); *G06F 16/2365* (2019.01); *G06F 2209/548* (2013.01)

(58) Field of Classification Search
None
See application file for complete search history.

(56) References Cited

U.S. PATENT DOCUMENTS

| | | |
|---|---|---|
| 5,167,035 A | 11/1992 | Mann et al. |
| 7,031,308 B2 | 4/2006 | Garcia-luna-aceves et al. |
| 9,529,882 B2 | 12/2016 | Vermeulen |

(Continued)

FOREIGN PATENT DOCUMENTS

| | | |
|---|---|---|
| CN | 102668516 A | 9/2012 |
| WO | 2020/117413 A1 | 6/2020 |

OTHER PUBLICATIONS

International Preliminary Report on Patentability received for PCT Application No. PCT/US2019/059775, dated Jun. 17, 2021, 7 Pages.

(Continued)

*Primary Examiner* — Bai D Vu
(74) *Attorney, Agent, or Firm* — Holland & Hart LLP

(57) ABSTRACT

The "free world replication protocol" makes use of client computing resources, wherein the clients are not part of the replicated key-value store, but instead reside in the "free world" outside of the dedicated resources of the nodes of the replicated key-value store. In the free world replication protocol, only a single "write" client is authorized to modify the key-value store at any time but any number of clients may be authorized to read data from the key-value store. The write client sends its transactions to multiple nodes in the replicated key-value store. As a result, the latency between the transaction being sent from the client and the transaction being received by the multiple nodes is reduced. A consensus protocol, driven by a master node, is used to periodically ensure consistency, but the data transactions themselves do not make use of a master node.

20 Claims, 13 Drawing Sheets

(56) References Cited

U.S. PATENT DOCUMENTS

| | | |
|---|---|---|
| 11,055,313 B2 | 7/2021 | Mittal et al. |
| 2011/0246503 A1* | 10/2011 | Bender .................. G06F 9/546 |
| | | 707/769 |
| 2016/0277201 A1 | 9/2016 | Thubert et al. |
| 2017/0078387 A1 | 3/2017 | Xu et al. |
| 2017/0280359 A1 | 9/2017 | Dong |
| 2018/0067864 A1 | 3/2018 | Park et al. |
| 2019/0342204 A1 | 11/2019 | Chen et al. |
| 2020/0183951 A1 | 6/2020 | Mittal et al. |

OTHER PUBLICATIONS

"SRM using NS-2", Retrieved from the Internet URL: http://nile.wpi.edu/NS/example_srm.html, Nov. 2, 2018, 7 pages.

Non-Final Office Action Received for U.S. Appl. No. 16/210,948, dated Nov. 19, 2020, 14 Pages.

Notice of Allowance Received for U.S. Appl. No. 16/210,948, dated Mar. 10, 2021, 9 Pages.

Li et al., "Just Say No to Paxos Overhead:Replacing Consensus with Network Ordering", Retrieved from Internet URL: https://www.usenix.Org/sites/default/files/osdi16_full_proceedings_interior.pdf, USENIX, USENIX, The Advanced Computing Systems Association, Nov. 2, 2016, pp. 467-483.

International Search report received for PCT Application No. PCT/US2019/059775, dated Jan. 9, 2020, 6 pages.

International Search report received for PCT Application No. PCT/US2019/059775, dated Jan. 9, 2020, 8 pages.

* cited by examiner

300

PENDING MESSAGES TABLE — 310

| MESSAGE ID | CONTENT |
|---|---|
| 1001 | |
| 1003 | |
| 1004 | |
| 1005 | |

320 — MESSAGE ID / CONTENT
330A — 1001
330B — 1003
330C — 1004
330D — 1005

*FIG. 3*

FREE WORLD REPLICATION PROTOCOL FOR KEY-VALUE STORE

CROSS REFERENCES

This application is a continuation of U.S. patent application Ser. No. 16/210,948 by Mittal et al., entitled "Free World Replication Protocol for Key-Value Store," and filed on Dec. 5, 2018, which is incorporated herein by reference in its entirety.

TECHNICAL FIELD

The subject matter disclosed herein generally relates to replication protocols. Specifically, in some example embodiments, the present disclosure addresses systems and methods for maintaining data consistency using a free world replication protocol for a key-value store.

BACKGROUND

A key-value store stores data by associating keys with values. Each key is associated with exactly one value in the key-value store. A distributed key-value store uses multiple computers (nodes) to store the data of the key-value store. A replicated key-value store maintains multiple copies of the data on each of the nodes of a distributed key-value store. By using replication, data integrity is maintained even if one of the multiple computers fails or is shut down. Data consistency between nodes is maintained using a consensus protocol.

Consensus protocols like PAXOS, Raft, and EPAXOS provide strong consistency. Consensus is a process of determining a single result among a group of participants, even when the members of the group have received different data or received the same data in a different order. Strong consistency requires that the group of participants observes only a single consistent state. By contrast, weak consistency allows different participants to observe different intermediate states between consensus states.

BRIEF DESCRIPTION OF THE DRAWINGS

Some embodiments are illustrated by way of example and not limitation in the figures of the accompanying drawings.

FIG. 3 is a block diagram illustrating a database schema suitable for implementing a free world replication protocol for a key-value store, according to some example embodiments.

DETAILED DESCRIPTION

Figure 1:
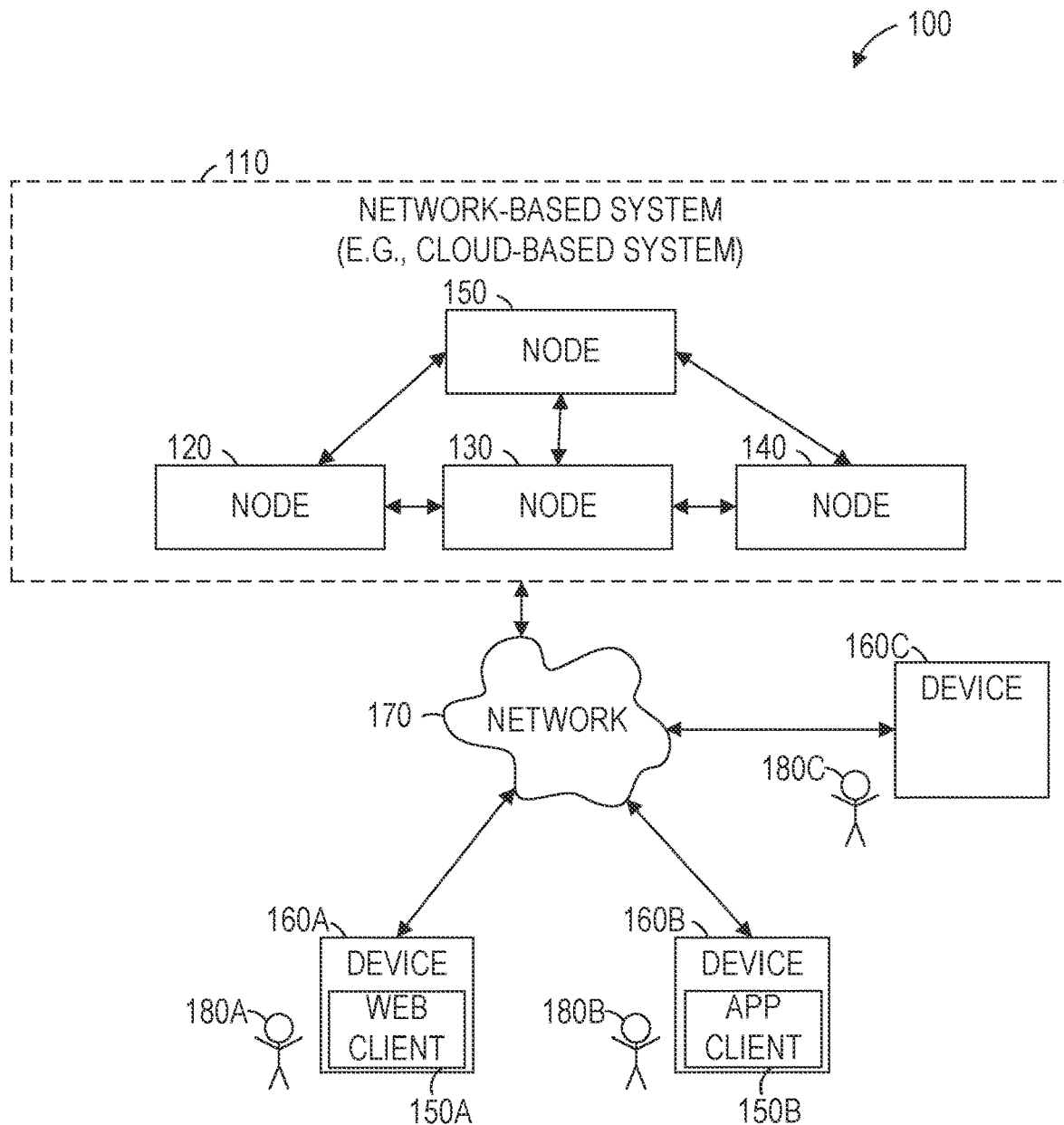
FIG. 1 is a network diagram illustrating a network environment suitable for implementing a free world replication protocol for a key-value store, according to some example embodiments.

Example methods and systems are directed to systems and user interfaces for maintaining data consistency using a free world replication protocol for a key-value store. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Described herein are systems and methods using a free world replication protocol that takes advantage of client computing resources. In existing consensus protocols, consensus is determined by the replication nodes without making use of the client resources. In other words, in existing consensus protocols the clients are independent entities and do not perform operations for determining consensus. The name "free world replication protocol" is derived from the fact that the protocol makes use of client computing resources, wherein the clients are not part of the replicated key-value store, but instead reside in the "free world" outside of the dedicated resources of the nodes of the replicated key-value store.

In the free world replication protocol, a write client sends its transactions to multiple nodes (e.g., all nodes) in a replicated key-value store. As a result, the latency between the transaction being sent from the client and the transaction being received by the multiple nodes is reduced by comparison to existing protocols in which each client sends transactions to a single node and that node forwards the transactions.

In some example embodiments, only a single client (the "write client") is authorized to modify the key-value store at any time but any number of clients (the "read clients") may be authorized to read data from the key-value store. In these embodiments, the free world replication protocol does not guarantee strong consistency, but it does guarantee eventual consistency with no inconsistencies at any time. In other words, at any time, different nodes may be in a different state by virtue of one node having implemented a transaction and the other node having not implemented the transaction, but the different state will never reflect one transaction being implemented on one node and a different transaction being implemented on another node.

In other example embodiments, multiple write clients are allowed. In implementations without compare and commit transactions, no transactions will be rejected by the nodes of the key-value store due to conflicts. In implementations with compare and commit transactions, one of a set of conflicting transactions will be committed and the other conflicting transactions will be rejected. Through the use of quorum detection, all nodes will agree on which of the conflicting transactions will be committed.

In some present embodiments, a consensus protocol, driven by a master node, is used to periodically ensure consistency, but the data transactions themselves do not make use of a master node. As a result, nodes are always available to process writes from the single write client and reads from any number of read clients. As a further result, the number of communication round trips used to perform reads and writes is reduced, reducing latency.

The master node requests data regarding received transactions from each of the other nodes. Each node provides the master node with the requested data (e.g., in a bitmap in which each bit corresponds to a different transaction). Based on the received data, the master node causes each node to receive any missing transactions. Once a quorum of the nodes has confirmed that all transactions up to a certain transaction have been received, the master node instructs the nodes to commit those transactions.

Technical problems exist with respect to replicating data among multiple nodes of a distributed key-value store. The systems and methods described herein seek to address these problems by making use of the resources of a write client to transmit transactions to more than one of the multiple nodes. As a result of this technical improvement, latency in transactions is reduced, improving the performance of the distributed key-value store.

Additionally, computing resources may be saved by using the systems and methods described herein, which is a further technical improvement. Examples of such computing resources include processor cycles, network traffic, memory usage, data storage capacity, power consumption, and cooling capacity. As just one example, by avoiding a requirement to retransmit every transaction from the node receiving the transaction, systems and methods may avoid processor cycles, memory usage, network bandwidth or other computing resources associated with receiving transactions by nodes of a distributed key-value store.

FIG. 1 is a network diagram illustrating a network environment 100 suitable for implementing a free world replication protocol for a key-value store, according to some example embodiments. The network environment 100 includes a network-based system 110, a device 160A, a device 160B, and a device 160C all communicatively coupled to each other via a network 170. The devices 160A-160C may be collectively referred to as "devices 160," or generically referred to as a "device 160." The network-based system 110 comprises nodes 120, 130, 140, and 150. The devices 160 may interact with the network-based system 110 using a web client 150A or an app client 150B. The nodes 120-150 and the devices 160 may each be implemented in a computer system, in whole or in part, as described below with respect to FIG. 2.

The network-based system 110 provides distributed data storage to other machines (e.g., the devices 160) via the network 170. Each of the nodes 120-150 stores a replica of the data. At any given time, one of the devices 160 may be a write client that is allowed to write and modify data in the distributed data store. The other devices 160 are allowed to read data but not to modify data. When a write client writes data to the distributed data store, the client sends the transaction to multiple nodes (e.g., all of the nodes). As each node receives transactions, the transactions are added to a journal. The transactions in the journal are committed only after receiving an instruction from the master node. Until the transactions in the journal are committed, data read from the node does not reflect the transactions. After the transactions are committed, data read from the node does reflect the transactions.

One node is the master node for control messages. The master node ensures that a quorum of nodes agree on a sequence of transactions before instructing all nodes to commit the transactions. A quorum of nodes is defined in a manner that ensures that any two quorums have at least one overlapping member. Thus, it is not possible for two quorums to exist that report different sequences of transactions. As a result, consistency of the distributed data store is guaranteed as soon as a quorum is reached, without having to wait for unanimity. The master node provides control messages to any nodes that do not agree on the sequence of transactions of the quorum. In response to the control messages, the nodes lacking transactions request the missing data from one or more nodes that have received the transactions. As a result, unanimity is eventually reached.

The distributed key-value store may be a leaderless key-value store. In a distributed key-value store having a leader, changes to the key-value store are sent to the leader and the leader propagates the changes to the other nodes. In a leaderless key-value store, changes to the key-value store are sent to any node (or to a plurality of nodes), and changes are propagated between the nodes.

Also shown in FIG. 1 are users 180A, 180B, and 180C that may be referred to generically as "a user 180" or collectively as "users 180." Each user 180 may be a human user (e.g., a human being), a machine user (e.g., a computer configured by a software program to interact with the devices 160 and the network-based system 110), or any suitable combination thereof (e.g., a human assisted by a machine or a machine supervised by a human). The users 180 are not part of the network environment 100 but are each associated with one or more of the devices 160 and may be users of the devices 160 (e.g., the user 180A may be an owner of the device 160A, the user 180B may be an owner of the device 160B, and the user 180C may be an owner of the device 160C). For example, the device 160A may be a desktop computer, a vehicle computer, a tablet computer, a navigational device, a portable media device, or a smartphone belonging to the user 180A.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 2. As used herein, a "database" is a data storage resource that stores data structured as a text file, a table, a spreadsheet, a relational database (e.g., an object-relational database, a NoSQL database, a network or graph database), a triple store, a hierarchical data store, a key-value store, or any suitable combination thereof. Additionally, data accessed (or stored) via an application programming interface (API) or remote procedure call (RPC) may be considered to be accessed from (or stored to) a database. Moreover, any two or more of the machines, databases, or devices illustrated in FIG. 1 may be combined into a single machine, database, or device, and the functions described herein for any single machine, database, or device may be subdivided among multiple machines, databases, or devices.

The network 170 may be any network that enables communication between or among machines, databases, and devices (e.g., the nodes 120-150 and the devices 160). Accordingly, the network 170 may be a wired network, a wireless network (e.g., a mobile or cellular network), or any suitable combination thereof. The network 170 may include one or more portions that constitute a private network, a public network (e.g., the Internet), or any suitable combination thereof.

Figure 2:
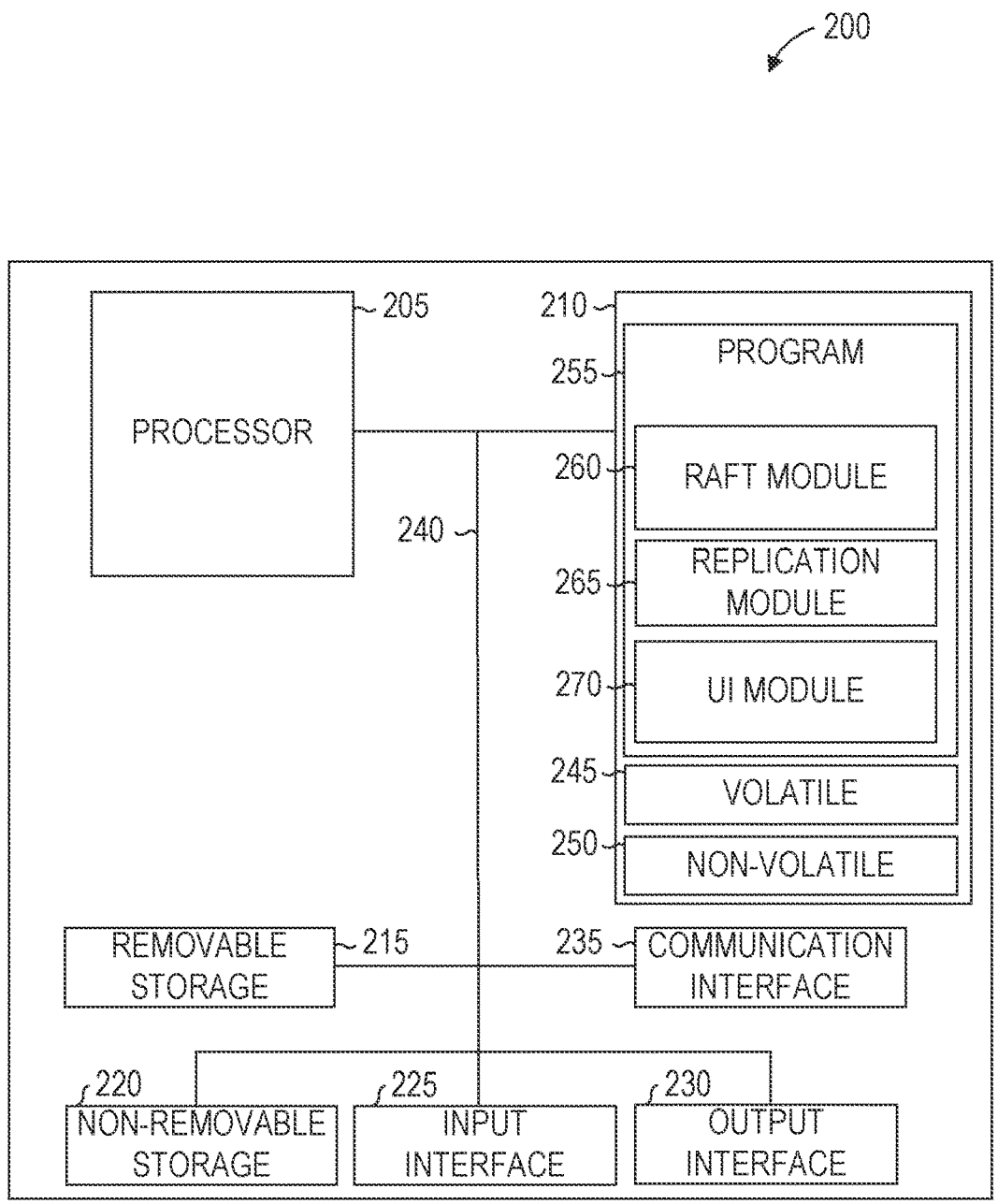
FIG. 2 is a block diagram illustrating components of a computer (e.g., a replication node), according to some example embodiments.

FIG. 2 is a block diagram illustrating components of a computer 200 (e.g., the node 120), according to some example embodiments. All components need not be used in various embodiments. For example, clients, servers, autonomous systems, and cloud-based network resources may each use a different set of components, or, in the case of servers for example, larger storage devices.

One example computing device in the form of the computer 200 (also referred to as a computing device 200 and a computer system 200) may include a processor 205, a computer-storage medium 210, removable storage 215, and non-removable storage 220, all connected by a bus 240. Although the example computing device is illustrated and described as the computer 200, the computing device may be in different forms in different embodiments. For example, the computing device 200 may instead be a smartphone, a tablet, a smartwatch, or another computing device including elements the same as or similar to those illustrated and described with regard to FIG. 2. Devices such as smartphones, tablets, and smartwatches are collectively referred to as "mobile devices." Further, although the various data storage elements are illustrated as part of the computer 200, the storage may also or alternatively include cloud-based storage accessible via a network, such as the Internet, or server-based storage.

The computer-storage medium 210 includes volatile memory 245 and non-volatile memory 250. The volatile memory 245 or the non-volatile memory 250 stores a program 255. The computer 200 may include, or have access to, a computing environment that includes a variety of computer-readable media, such as the volatile memory 245, the non-volatile memory 250, the removable storage 215, and the non-removable storage 220. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 200 includes or has access to a computing environment that includes an input interface 225, an output interface 230, and a communication interface 235. The output interface 230 interfaces to or includes a display device, such as a touchscreen, that also may serve as an input device. The input interface 225 interfaces to or includes one or more of a touchscreen, a touchpad, a mouse, a keyboard, a camera, one or more device-specific buttons, one or more sensors integrated within or coupled via wired or wireless data connections to the computer 200, and other input devices. The computer 200 may operate in a networked environment using the communication interface 235 to connect to one or more remote computers, such as database servers. The remote computer may include a personal computer (PC), server, router, network PC, peer device or other common network node, or the like. The communication interface 235 may connect to a local-area network (LAN), a wide-area network (WAN), a cellular network, a WiFi network, a Bluetooth network, or other networks.

Computer instructions stored on a computer-storage medium (e.g., the program 255 stored in the computer-storage medium 210) are executable by the processor 205 of the computer 200. As used herein, the terms "machine-storage medium," "device-storage medium," and "computer-storage medium" (referred to collectively as "machine-storage medium") mean the same thing and may be used interchangeably. The terms refer to a single or multiple storage devices and/or media (e.g., a centralized or distributed key-value store, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors 205. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and signal media. Thus, the terms include both storage devices/media and carrier waves/modulated data signals.

The program 255 may further be transmitted or received over the network 170 using a transmission medium via the communication interface 235 and utilizing any one of a number of well-known transfer protocols (e.g., Hypertext Transfer Protocol (HTTP)). Examples of networks 170 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions for execution by the computer 200, and includes digital or analog communications signals or other intangible media to facilitate communication of such software.

The program 255 is shown as including a Raft module 260, a replication module 265, and a user interface (UI) module 270. Any one or more of the modules described herein may be implemented using hardware (e.g., a processor of a machine, an application-specific integrated circuit (ASIC), an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The Raft module 260 sends and receives Raft control messages. The Raft leader gathers sequence identifiers from at least a quorum of replica nodes and reconciles the sequence identifiers among the replica nodes. The Raft leader sends data to the replica nodes informing the replica nodes of which sequence identifiers have been received by at least a quorum. The replica nodes can commit the transactions corresponding to the sequence identifiers that are confirmed by the Raft leader as having been received by at least a quorum.

The replication module 265 sends requests for data from one node to another node and provides data in response to requests from other nodes. For example, the write client may write three transactions with sequence identifiers 1, 2, and 3, sending the transactions to each of the nodes 120-150. If all transactions arrive successfully except that the transaction with sequence identifier 2 failed to arrive at the node 150, the Raft modules 260 of the nodes 120-150 would determine that three transactions have been received by a quorum and the replication modules 265 of the node 150 and at least one other node would cause the missing transaction to be replicated by the node 150.

The UI module 270 causes presentation of a UI for the distributed data store to a user 180. For example, a command-line or graphical SQL interface may be presented that allows the user to request data from the data store, view data from the data store, write data to the data store, modify data in the data store, delete data in the data store, or any suitable combination thereof.

FIG. 3 is a block diagram illustrating a database schema 300 suitable for implementing a free world replication protocol for a key-value store, according to some example embodiments. The database schema 300 may be suitable for use by the replication module 265 and the Raft module 260. The database schema 300 includes a pending message table 310, an implementation of a journal of pending transactions. The pending message table 310 is defined by a table definition 320, including a message identifier field and a content field. The pending messages table 310 includes rows 330A, 330B, 330C, and 330D.

Each of the rows 330A-330D stores information for a message received by a node but not yet committed. The message identifier for each row indicates a unique identifier for the transaction of the message. The content field of each row contains the transaction. In the example of FIG. 3, the node has received messages with identifiers 1001, 1003, 1004, and 1005. Since the message identifier 1002 is missing from the sequence, it is likely that the node will request the missing transaction from one or more other nodes. Alternatively, if no quorum of nodes has received the message with identifier 1002, processing will continue despite the skipped identifier.

Figure 4:
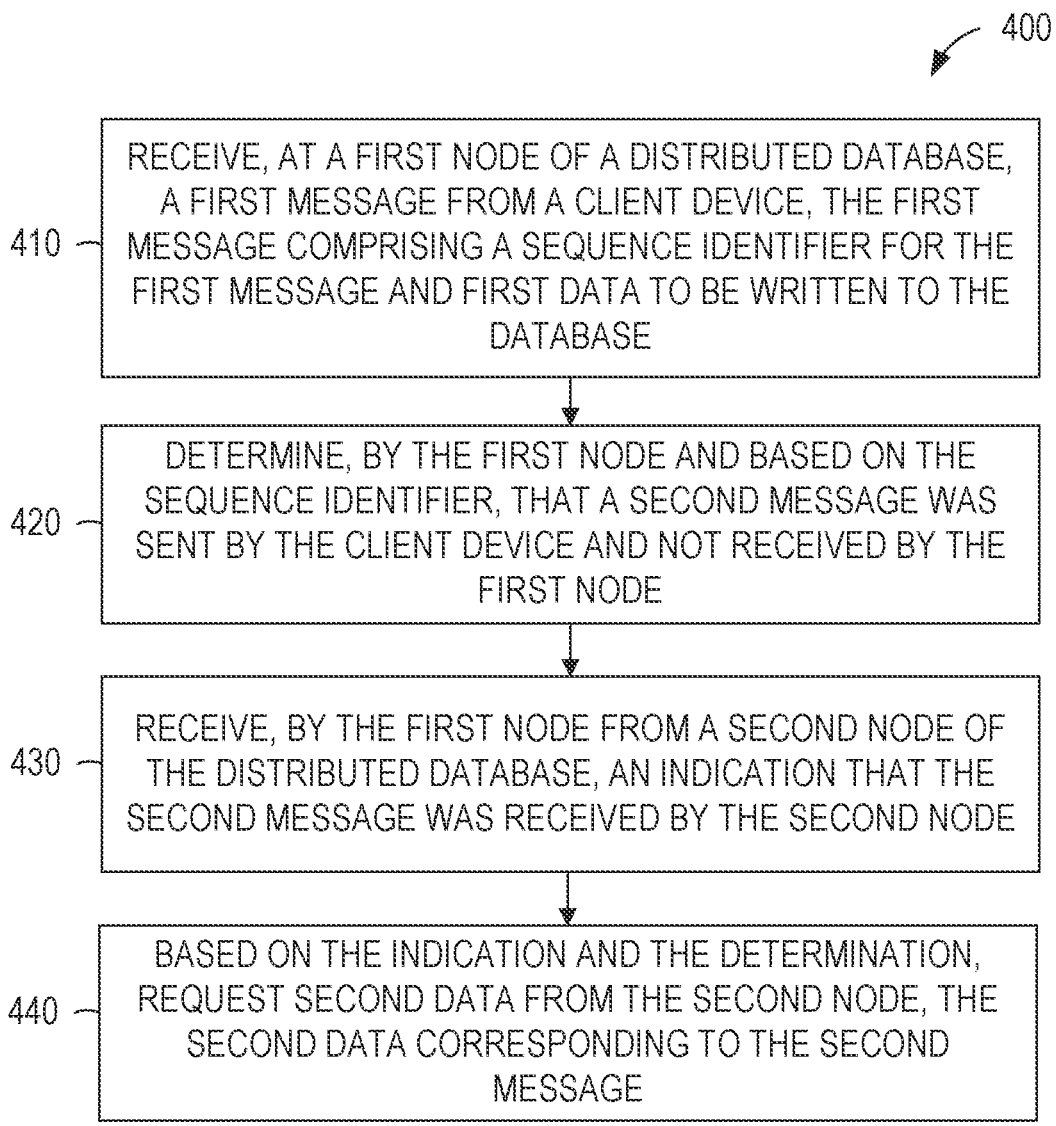
FIG. 4 is a flow diagram illustrating operations by a first node of a replicated key-value store in a method of using a free world replication protocol, according to some example embodiments.

FIG. 4 is a flow diagram illustrating operations by a first node of a replicated key-value store in performing a method 400 using a free world replication protocol, according to some example embodiments. The method 400 includes operations 410, 420, 430, and 440 and allows the first node to recover from missing a message from a client device. By way of example and not limitation, the method 400 is described as being performed by the systems, modules, and databases of FIGS. 1-3.

In operation 410, the replication module 265 of a first node of a distributed key-value store (e.g., the node 120 of FIG. 1) receives a first message from a client device (e.g., the device 160A), the first message comprising a sequence identifier for the first message and first data to be written to the key-value store. For example, the first message may have the sequence identifier 1003.

In operation 420, the replication module 265 of the first node determines, based on the sequence identifier, that a second message was sent by the client device and not received by the first node. For example, if the first node has only the row 330A of the pending messages table 310 (of FIG. 3) before receiving the first message, the first node can update the pending messages table 310 to further include the row 330B, corresponding to the message identifier 1003 (used as a sequence identifier in this example). If the message identifiers are sent sequentially by the client, the replication module 265 can determine that a message having sequence identifier 1002 was sent by the client and not received by the first node.

In operation 430, the replication module 265 of the first node receives, from a second node of the distributed key-value store (e.g., the node 130 of FIG. 1), an indication that the second message was received by the second node. For example, the first node may send a request to one or more of the nodes 130-150 (e.g., to all of the nodes 130-150) requesting that the node respond if the node has received a message with the sequence identifier 1002. As another example, the first node may send a request to one or more of the nodes 130-150 (e.g., to all of the nodes 130-150) requesting that the node provide an indication of which messages were received within a specified range of sequence identifiers. In either example, one or more responses are received that comprise an indication that a node has received the second message.

In operation 440, based on the indication and the determination, the replication module 265 of the first node requests second data from the second node, the second data corresponding to the second message. For example, the nodes 130 and 140 may both indicate that they have received the second message. In response, the replication module 265 requests the second message from one or more both the nodes 130 and 140.

Thus, by use of the method 400, the first node receives the second message from another node, allowing recovery from the failed delivery of the second message from the client to the first node. As a result, the first node can perform any requested modifications on the key-value store in the order intended by the client.

Figure 5:
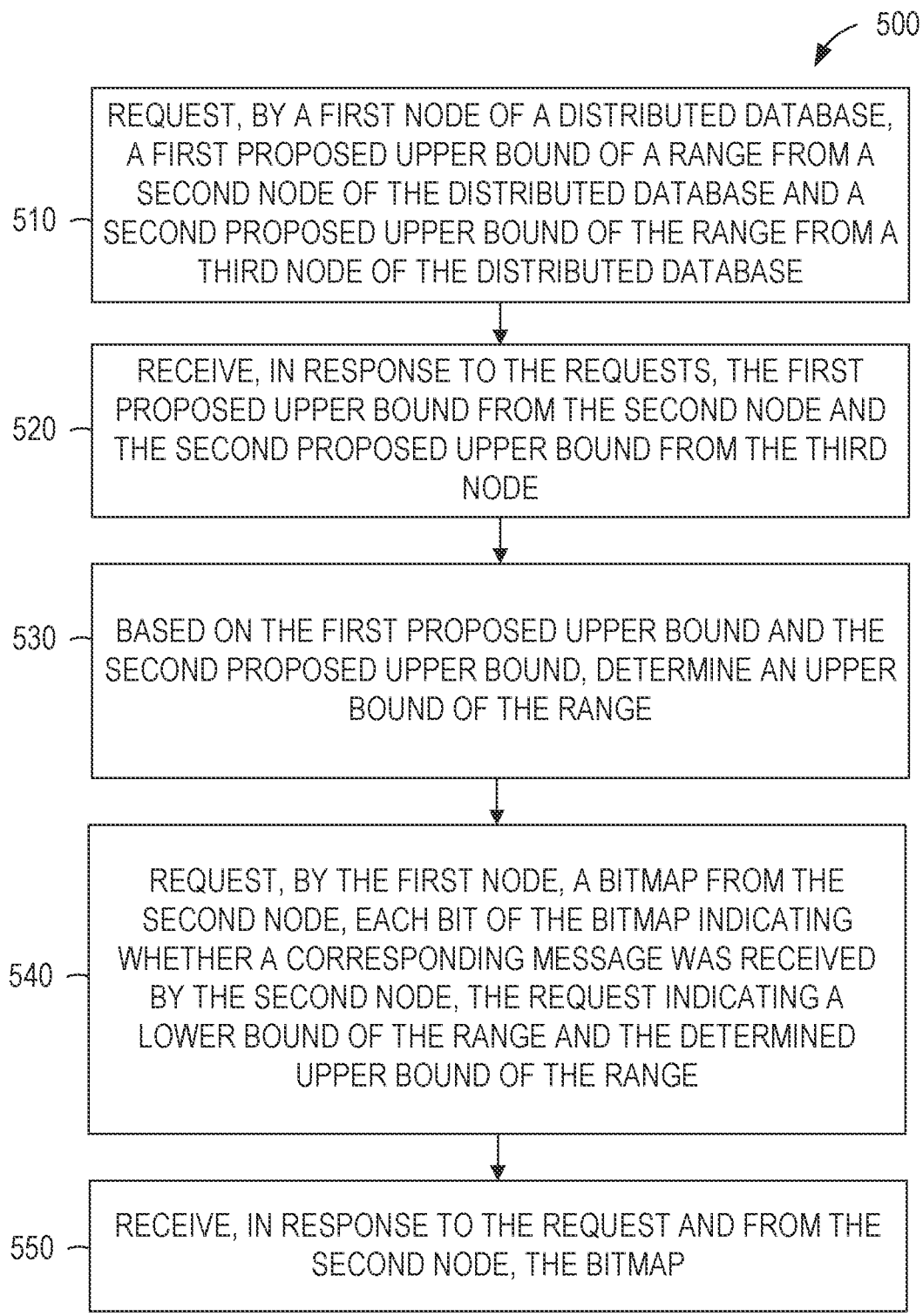
FIG. 5 is a flow diagram illustrating operations by a first node of a replicated key-value store in a method of using a free world replication protocol, according to some example embodiments.

FIG. 5 is a flow diagram illustrating operations by a first node of a replicated key-value store in a method 500 of using a free world replication protocol, according to some example embodiments. The method 500 includes operations 510, 520, 530, 540, and 550 and may be used to implement operations 420 and 430 of the method 400. By way of example and not limitation, the method 500 is described as being performed by the systems, modules, and databases of FIGS. 1-3.

In operation 510, the replication module 265 of the first node of a distributed key-value store (e.g., the node 120 of FIG. 1) requests a first proposed upper bound of a range from a second node of the distributed key-value store (e.g., the node 130) and a second proposed upper bound of the range from a third node of the distributed key-value store (e.g., the node 140). In this example, the proposed upper bound is requested from two nodes, but in other example embodiments, the proposed upper bound is requested from three nodes or from all nodes other than the first node in the distributed key-value store. The request may include a client identifier.

In operation 520, the replication module 265 of the first node receives, in response to the requests, the first proposed upper bound from the second node and the second proposed upper bound from the third node. For example, each of the nodes that received the request may respond with the highest sequence identifier among the sequence identifiers of messages received by the node. In embodiments in which the request includes a client identifier, the response may be the highest sequence identifier among the sequence identifiers of messages received by the node from the identified client.

In operation 530, the replication module 265 of the first node determines, based on the first proposed upper bound and the second proposed upper bound, an upper bound of the range. For example, the highest value among the received proposed upper bounds may be selected by the first node as the upper bound of the range.

The replication module 265 of the first node, in operation 540, requests a bitmap from the second node, each bit of the bitmap indicating whether a corresponding message was received by the second node, the request indicating a lower bound of the range and the determined upper bound of the range. Operation 540 may be repeated for additional nodes in the distributed key-value store (e.g., so that requests are sent to the second and third nodes, to all nodes to which the requests were sent in operation 510, or all nodes other than the first node in the distributed key-value store). The lower bound of the range may be based on an upper bound of a previous request (e.g., the same as the upper bound of the previous request or one greater than the upper bound of the previous request).

In operation 550, the replication module 265 of the first node receives, in response to the request and from the second node, the bitmap. For example, if the second node had received messages with identifiers 1001, 1003, 1004, and 1005 as shown in the pending messages table 310 of FIG. 3 and the bounds included in the request of operation 540 were 1001 and 1007, the second node would respond with a bitmap comprising seven bits, each bit corresponding to one message identifier in the range 1001-1007. Since the messages with identifiers 1001, 1003, 1004, and 1005 were received by the second node and the messages with identifiers 1002, 1006, and 1007 were not received by the second node, the corresponding bits would be set or cleared. For example, in a one-byte bitmap the values X0011101 might be sent, where X indicates a don't-care bit, 0 indicates that the corresponding message was not received, and 1 indicates that the corresponding message was received. In other example embodiments, big-endian or little-endian schemes are used or bits have the opposite sense than in this example.

Figure 6:
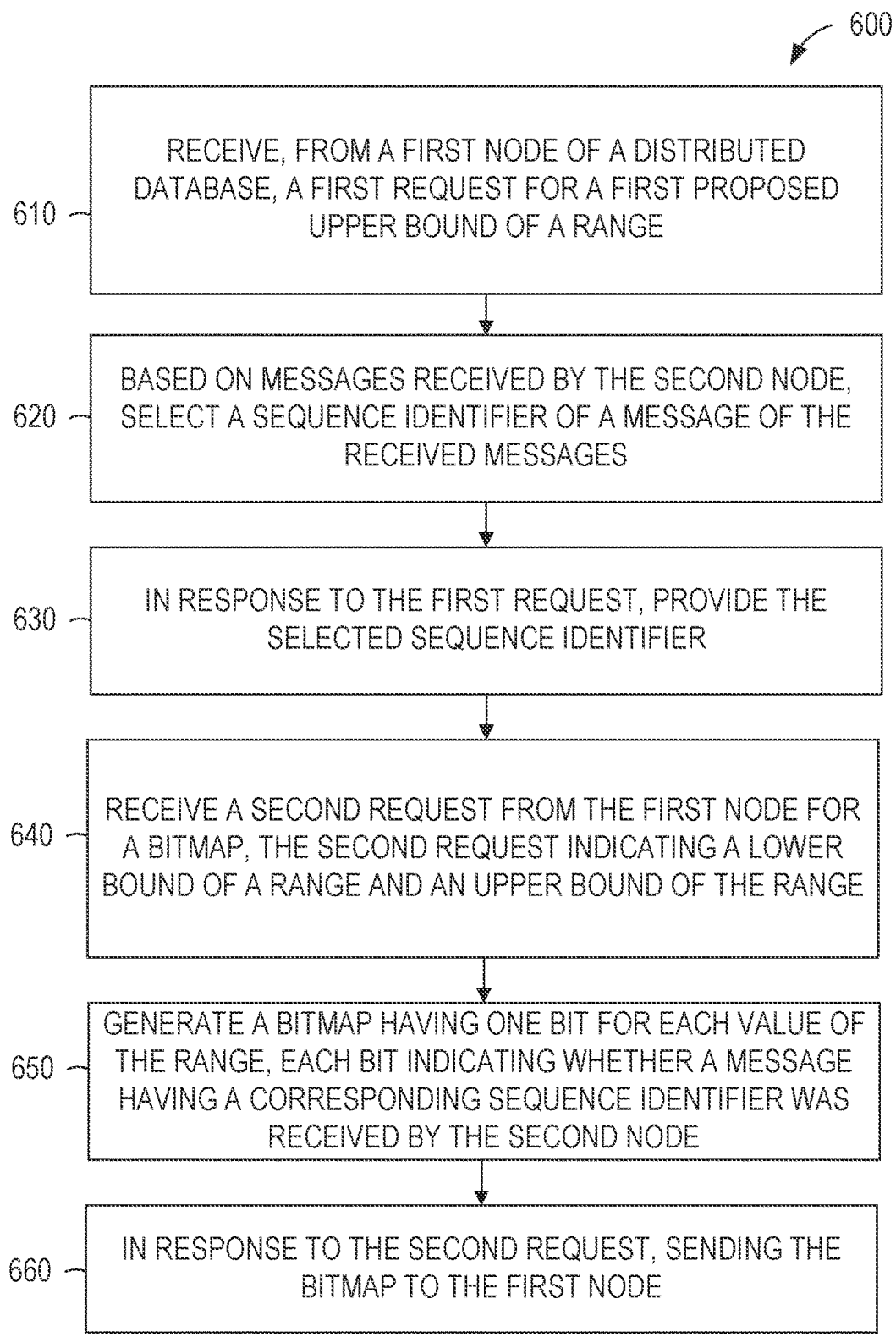
FIG. 6 is a flow diagram illustrating operations by a second node of a replicated key-value store in a method of using a free world replication protocol, according to some example embodiments.

FIG. 6 is a flow diagram illustrating operations by a second node of a replicated key-value store in a method 600 of using a free world replication protocol, according to some example embodiments. The method 600 describes operations performed by the second node in responding to the communications from the first node in the method 500 and includes operations 610, 620, 630, 640, 650, and 660. By way of example and not limitation, the method 600 is described as being performed by the systems, modules, and databases of FIGS. 1-3.

In operation 610, the replication module 265 of a second node (e.g., the node 130 of FIG. 1) receives, from a first node of a distributed key-value store (e.g., the node 120 of FIG. 1), a first request for a first proposed upper bound of a range. For example, the request sent by the first node in operation 510 may be received.

The replication module 265 of the second node 130, based on messages received by the second node 130, selects a sequence identifier of a message of the received messages (operation 620). For example, the highest sequence identifier among the received messages may be selected (e.g., the sequence identifier 1005, with reference to the pending messages table 310 of FIG. 3).

In operation 630, the replication module 265 of the second node 130, in response to the first request, provides the selected sequence identifier. For example, the second node 130 may transmit a packet to the first node 120, the packet comprising the selected sequence identifier.

The replication module 265 of the second node 130, in operation 640, receives a second request from the first node 120 for a bitmap, the second request indicating a lower bound of a range and an upper bound of the range. In operation 650, the replication module 265 generates a bitmap having one bit for each value of the range, each bit indicating whether a message having a corresponding sequence identifier was received by the second node 130. The replication module 265 of the second node 130, in response to the second request, sends the bitmap to the first node 120 (operation 660).

The method 600 may be performed by each of the nodes that receive the requests sent by the first node in the method 400. In this way, the nodes of the distributed key-value store cooperate to provide the first node with information concerning which messages were received by multiple nodes, allowing the nodes to ensure data consistency.

Figure 7:
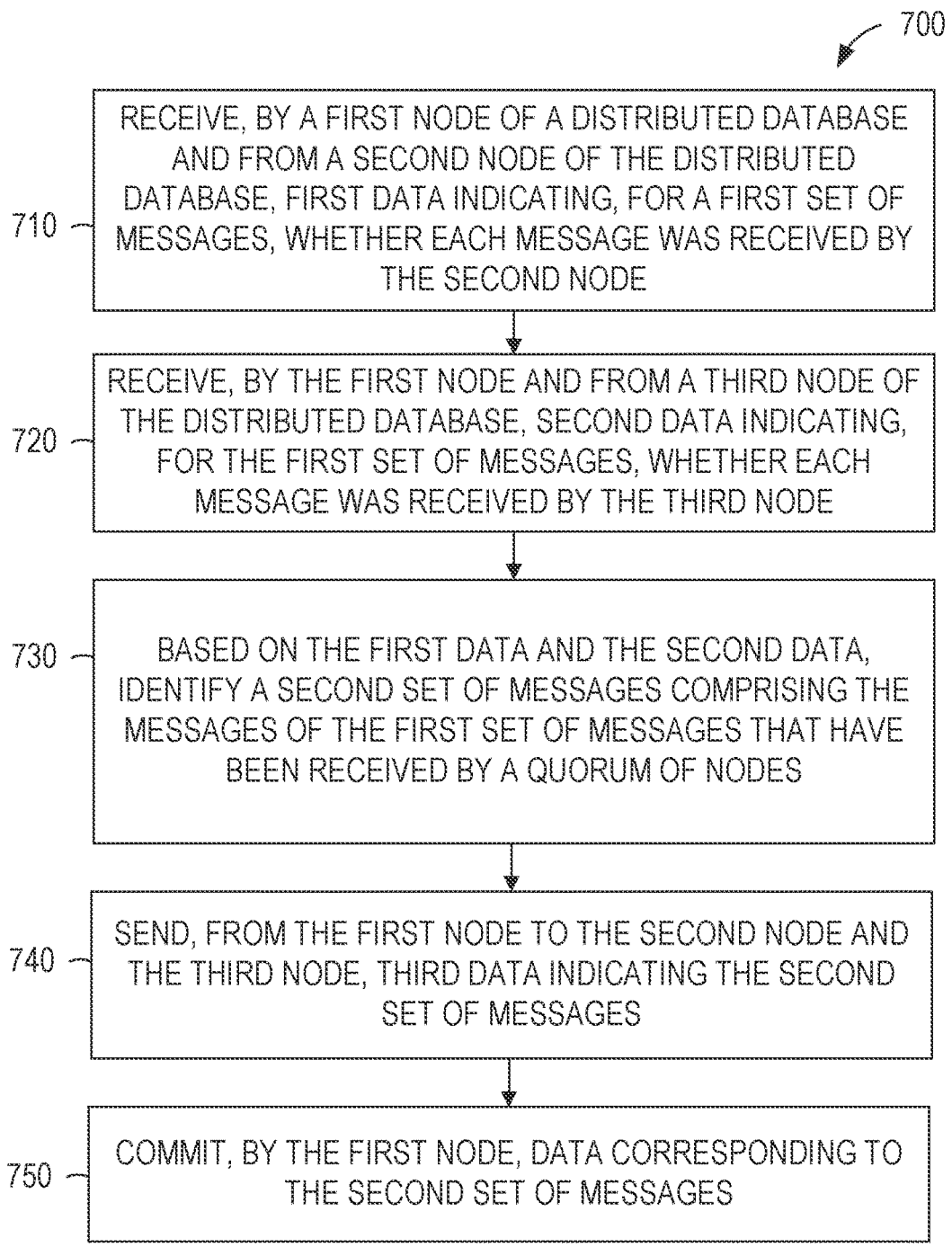
FIG. 7 is a flow diagram illustrating operations by a first node of a replicated key-value store in a method of using a free world replication protocol, according to some example embodiments.

FIG. 7 is a flow diagram illustrating operations by a first node 120 of a replicated key-value store in a method 700 of using a free world replication protocol, according to some example embodiments. The method 700 describes operations performed by a node in a distributed key-value store to safely commit data in a journal and includes operations 710, 720, 730, 740, and 750. By way of example and not limitation, the method 700 is described as being performed by the systems, modules, and databases of FIGS. 1-3. Data is safely committed if committing the data cannot result in an inconsistency in the distributed key-value store.

In operation 710, a first node of a distributed key-value store (e.g., the node 120 of FIG. 1) receives, from a second node of the distributed key-value store (e.g., the node 130), first data indicating, for a first set of messages, whether each message was received by the second node 130. For example, the second node 130 may have sent a bitmap in operation 660 of the method 600, each bit of the bitmap indicating whether a corresponding message in the first set of messages was received by the second node 130.

In operation 720, the first node 120 receives, from a third node of the distributed key-value store (e.g., the node 140), second data indicating, for the first set of messages, whether each message was received by the third node 140. For example, the third node 140 may also perform the method 600 and may have sent a bitmap in operation 660. The receiving of operations 710 and 720 may be repeated for additional nodes of the distributed key-value store (e.g., a fourth node 150 of the distributed key-value store or all remaining nodes of the distributed key-value store).

Based on the first data and the second data, in operation 730 the first node 120 identifies a second set of messages comprising the messages of the first set of messages that have been received by a quorum of nodes. For example, if the distributed key-value store has three nodes, a quorum of nodes would be at least two nodes. Thus, the first node 120 is enabled to determine whether a quorum has received each message of the first set of messages by accessing its own journal to determine which messages it has received and accessing the first data and the second data to determine which messages were received by other nodes.

In operation 740, the first node 120 sends, to the second node 130 and the third node 140, third data indicating the second set of messages. In example embodiments in which data for the first set of messages was received from additional nodes, the third data may also be sent to the additional nodes. The third data may be sent in the form of a bitmap in which each bit corresponds to one of the messages in the first set of messages and each bit indicates whether the corresponding message is in the second set of messages or not. In some example embodiments, the third data is sent to one or more client devices.

The first node 120, in operation 750, commits data corresponding to the second set of messages. For example, data in the pending messages table 310 (FIG. 3) of the first node 120 may be committed by processing the content of the row having the message identifier of each message in the second set of messages and removing the row from the pending messages table 310. Additionally, if a message of the second set of messages does not have an entry in the pending messages table 310, the first node 120 requests the corresponding message from a node that indicated that the message was received. Once the message is received by the first node from the other node, the message is committed. The second node 130 and the third node 140 respond to the receipt of the third data by also committing the messages in the second set of messages.

Figure 8:
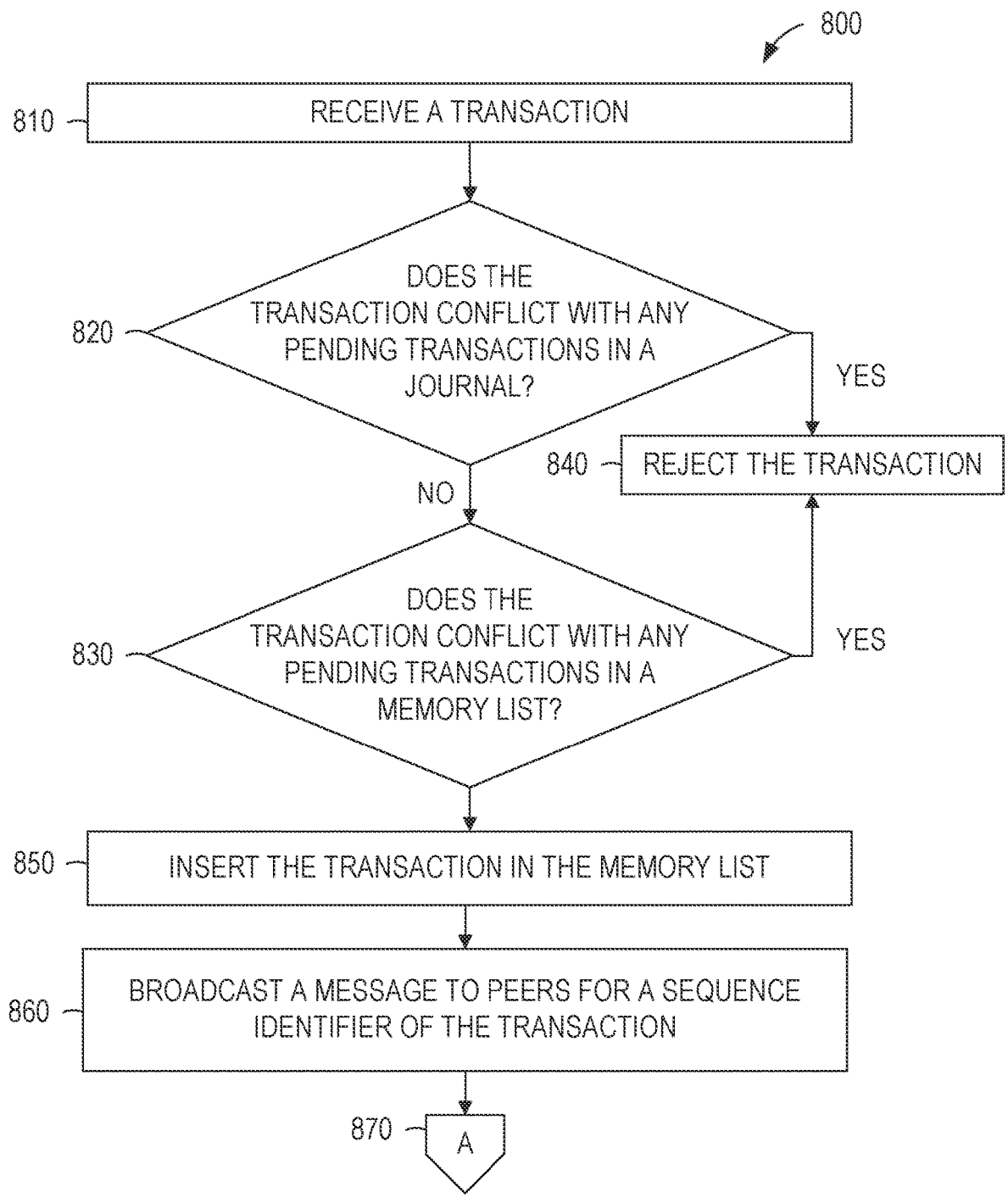
FIGS. 8-9 are a flow diagram illustrating operations by a first node of a replicated key-value store in a method of using a free world replication protocol, according to some example embodiments.
Figure 9:
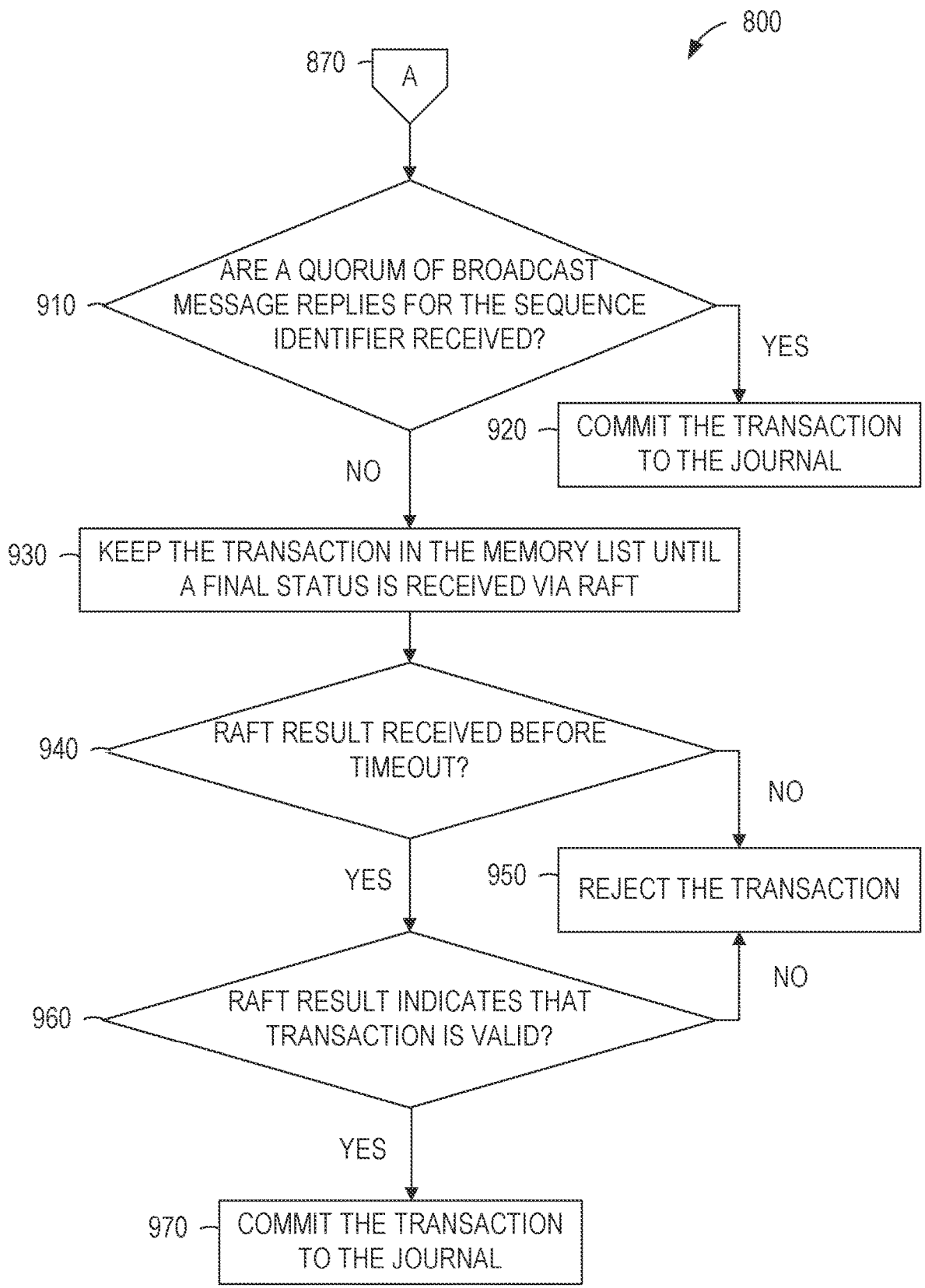

FIGS. 8-9 are a flow diagram illustrating operations by a first node of a replicated key-value store in a method 800 of using a free world replication protocol. The method 800 describes operations performed by a node in a distributed key-value store to safely commit data in a journal and includes operations 810, 820, 830, 840, 850, 860, 910, 920, 930, 940, 950, 960, and 970. The element 870 links FIGS. 8 and 9. By way of example and not limitation, the method 800 is described as being performed by the systems, modules, and databases of FIGS. 1-3. The method 800 allows the free world replication protocol to be used by multiple writeable clients, even when compare and commit operations are supported. Compare and commit operations are operations that only modify data if the current data meets certain conditions.

In operation 810, the replication module 265 of the first node (e.g., the node 120) receives a transaction. For example, the device 160A may be the write client of the distributed key-value store comprising the first node 120 and may send a transaction to each node of the distributed key-value store, including the first node 120, which receives the transaction.

In operation 820, the replication module 265 determines if the transaction conflicts with any pending transactions in a journal. For example, the transaction may include a message identifier and the replication module 265 may compare the message identifier of the transaction with message identifiers already stored in a journal (e.g., by searching the pending messages table 310 of FIG. 3 for entries having the message identifier of the transaction). If the transaction conflicts, the replication module 265 rejects the transaction (operation 840). For example, the first node 120 may send a message to the write client indicating that the message identifier was already used.

If the transaction did not conflict with any pending transactions in the journal, processing continues with operation 830. In operation 830, the replication module 265 determines if the transaction conflicts with any pending transactions in a memory list. The memory list stores transactions after they are received and before they are committed to the journal. A data structure similar to the pending messages table 310 may be used. If any transactions already in the memory list have the same message identifier as the transaction, the transaction is rejected (operation 840).

If the transaction did not conflict with any pending transactions, processing continues with operation 850. In operation 850, the replication module 265 inserts the transaction in the memory list.

In operation 860, the replication module 265 broadcasts a message to peers for a sequence identifier of the transaction. For example, the first node 120 may send a message to each other node in the distributed key-value store, the message including the sequence identifier and indicating that the sequence identifier was received by the first node 120. In response, the other nodes respond with a message that indicates whether the sequence identifier was received by the responding node.

If, in operation 910, a quorum of broadcast message replies for the sequence identifier were received, the replication module 265 commits the transaction to the journal (operation 920). For example, the transaction data may be written to the pending messages table 310 and removed from the memory list. If a quorum was not received, the process continues with operation 930 and the transaction is kept in the memory list until a final status is received (e.g., via Raft).

If no Raft result is received before a predetermined period of time passes (operation 940), the transaction is rejected (operation 950) and removed from the memory list. If the Raft result is received (operation 940) and indicates that the transaction is not valid (operation 960), the transaction is also rejected (operation 950). If the Raft result is received (operation 950) and indicates that the transaction is valid (operation 960), the replication module 265 commits the transaction to the journal (operation 970).

The Raft server, in performing its counterpart to operation 960 of transmitting Raft results indicating which transactions are valid and which are invalid, may also transmit part or all of the results to one or more clients of the distributed key-value store. For example, a list of the sequence identifiers for invalid transactions may be sent along with the last quorum sequence identifier. In this way, the clients may also keep track of which transactions were processed successfully and which were not. In response, the client may reattempt the failed transactions or take other corrective action.

Figure 10:
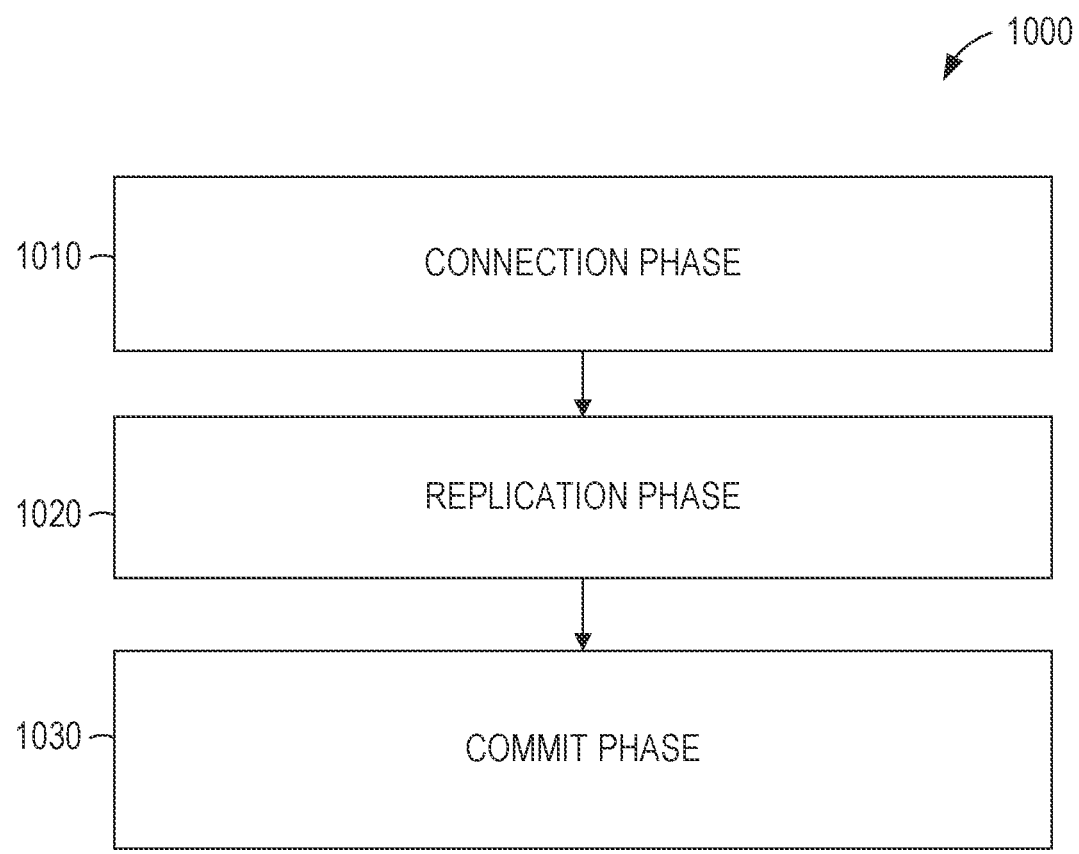
FIG. 10 is a phase diagram illustrating phases of operation by a client and a distributed key-value store, according to some example embodiments.

FIG. 10 is a phase diagram 1000 illustrating phases of operation by a client and a distributed key-value store, according to some example embodiments. The phase diagram 1000 includes a connection phase 1010, a replication phase 1020, and a commit phase 1030. The phases of the phase diagram 1000 are used in implementations with a single writeable client and no compare and commit operations.

When a client connects to the distributed key-value store in the connection phase 1010, the distributed key-value store uses a consensus protocol (e.g., Raft) to generate a unique session identifier for the client. Each node maintains a journal for each session identifier.

During the replication phase 1020, each write client includes a monotonically increasing sequence number in the write transactions it sends to the nodes and broadcasts the write transaction to all replica nodes in the distributed key-value store. When a quorum of acknowledgements is received by the client, the client can proceed with knowledge that the write transaction was successful. If a quorum of acknowledgements is not received within a predetermined time period, the client should retry the write transaction. The nodes respond to the client after logging the transaction to their journal for the session identifier of the write client. Replica nodes may receive transactions in any order, but the journal data is stored in order of sequence number.

In the commit phase 1030, each node will commit the transactions from the journals in the same order. Before a transaction can be committed by a node, the node determines the status of all preceding transactions, including any transactions that are determined to be missing due to a missing sequence number in the journal of the node. The node can determine the status of a transaction with a sequence number using Raft. If the sequence number was written to the journal of a quorum of nodes, the transaction is committed from the journal to the key-value store. Otherwise, the transaction is discarded from the journal. If the sequence number was written to the journal of a quorum of nodes, any node that is missing the sequence number requests the transaction from its peers.

Figure 11:
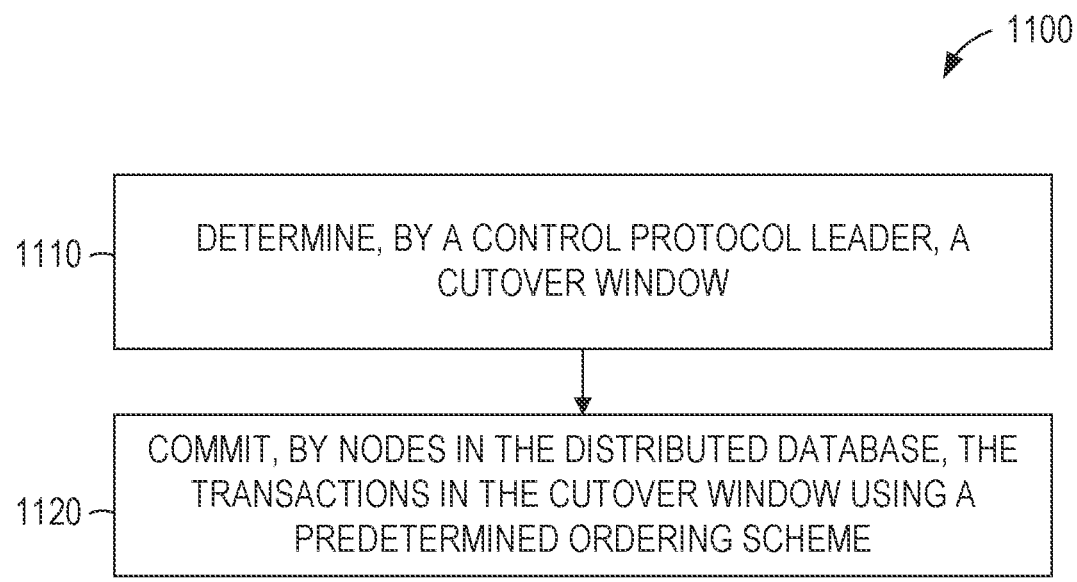
FIG. 11 is a flow diagram illustrating operations by nodes in a distributed key-value store in a method of committing transactions written by multiple writeable clients, according to some example embodiments.

FIG. 11 is a flow diagram illustrating operations by nodes in a distributed key-value store in a method 1100 of committing transactions written by multiple writeable clients, according to some example embodiments. The method 1100 includes operation 1110 and 1120.

In operation 1110, a control protocol leader (e.g., a node operating as a Raft leader) determines a cutover window. For example, all transactions received by the node before a certain time may be determined by the node to be in the cutover window. In some example embodiments, cutover windows are created based on a number of transactions received or a duration of time elapsed. For example, a cutover window may be created every minute or every five minutes on the system clock of the control protocol leader. Further transactions received by the control protocol leader after the determining of the cutover window are not included in the cutover window. The control protocol leader uses the control protocol (e.g., Raft) to inform the other nodes of the transactions in the cutover window. For example, a maximum sequence identifier for each session identifier may be sent to the other nodes.

In operation 1120, each node commits the transactions in the cutover window using a predetermined ordering scheme. The sequence identifiers for a single session identifier are monotonically increasing. Accordingly, the transactions for a particular session identifier are sorted in increasing order of the sequence identifiers. However, the sorting of transactions with different session identifiers is implementation-specific. One example method of sorting is sequence identifier first, in which lower sequence identifiers are committed before higher sequence identifiers regardless of the session identifier; if two transactions have the same sequence identifier, the transaction with the lower (or higher) session identifier is committed first. Another example method of sorting is session identifier first, in which all transactions from one writeable client are committed before the transactions from the next writeable client are handled; the order of processing the writeable clients is determined based on the session identifier of the clients. A third example method of sorting is true time first, in which the control protocol leader determines the order in which the transactions were received and provides the ordering to the other nodes. If two transactions were received simultaneously by the control protocol leader, the session identifier may be used to determine the order.

Figure 12:
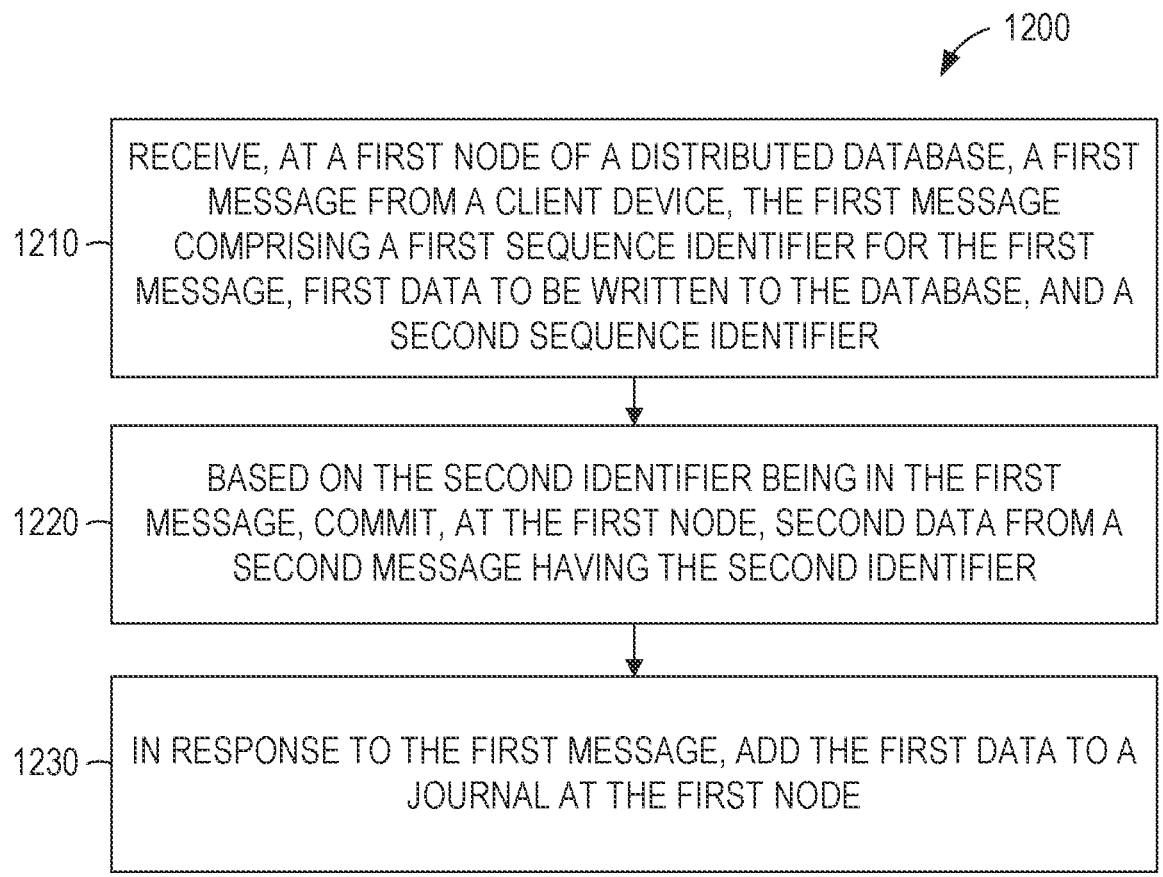
FIG. 12 is a flow diagram illustrating operations by a first node of a replicated key-value store in a method of using a free world replication protocol, according to some example embodiments.

FIG. 12 is a flow diagram illustrating operations by a first node of a replicated key-value store in a method 1200 of using a free world replication protocol, according to some example embodiments. The method 1200 includes operations 1210, 1220, and 1230 and allows the key-value store to provide strong consistency. By way of example and not limitation, the method 1200 is described as being performed by the systems, modules, and databases of FIGS. 1-3.

In operation 1210, the replication module 265 of a first node of a distributed key-value store (e.g., the node 120 of FIG. 1) receives a first message from a client device (e.g., the device 160A), the first message comprising a first sequence identifier for the first message, first data to be written to the key-value store, and a second sequence identifier. In an example, the first message has the first sequence identifier 1005 and the second sequence identifier is 1004.

The first message may include one or more additional sequence identifiers for transactions that failed. For example, the client may receive, from a Raft server, a list of sequence identifiers for transactions that failed and include that list in a subsequent message to a node of the distributed key-value store.

In operation 1220, the replication module 265 of the first node commits, based on the second sequence identifier being in the first message, that second data from a second message having the second identifier. In an example embodiment, the second sequence identifier is the last sent quorum sequence identifier received by the client device from a Raft node of the distributed key-store (e.g., the last sequence identifier received by the client device when the Raft node performed operation 730 of the method 700). In response to receiving the last sent quorum sequence identifier, the first node commits all uncommitted entries in its journal having sequence identifiers equal to or less than the last sent quorum sequence identifier. If any sequence identifiers are missing, operations 420-440 of the method 400 are performed before the method 1200 continues. In this way, the first node ensures that the local copy of the key-value store is synchronized with the state of the key-value store expected by the client device before the transaction of the first message is processed. In other words, strong consistency is achieved, and the same result will be obtained by the client device regardless of which node the first message is sent to and regardless of the state of the journal and key-value store of the selected node at the time the first message is received.

Prior to committing the uncommitted entries in the journal, the first node rejects any pending transactions corresponding to the one or more additional sequence identifiers for transactions that failed. Thus, if the client informs the first node of failed transactions before the Raft server does (e.g., due to network congestion), the first node updates its state with respect to both missing transactions not yet received and invalid transactions received and not yet rejected before continuing to process the current transaction.

In operation 1230, in response to the first message, the replication module 265 of the first node adds the first data of the first message to a journal at the first node. The first data will be committed once consensus is achieved, either by receipt of a message from a Raft node (e.g., in operation 730) or by receipt of a last sent quorum sequence identifier in operation 1210 of a later execution of the method 1200.

Figure 13:
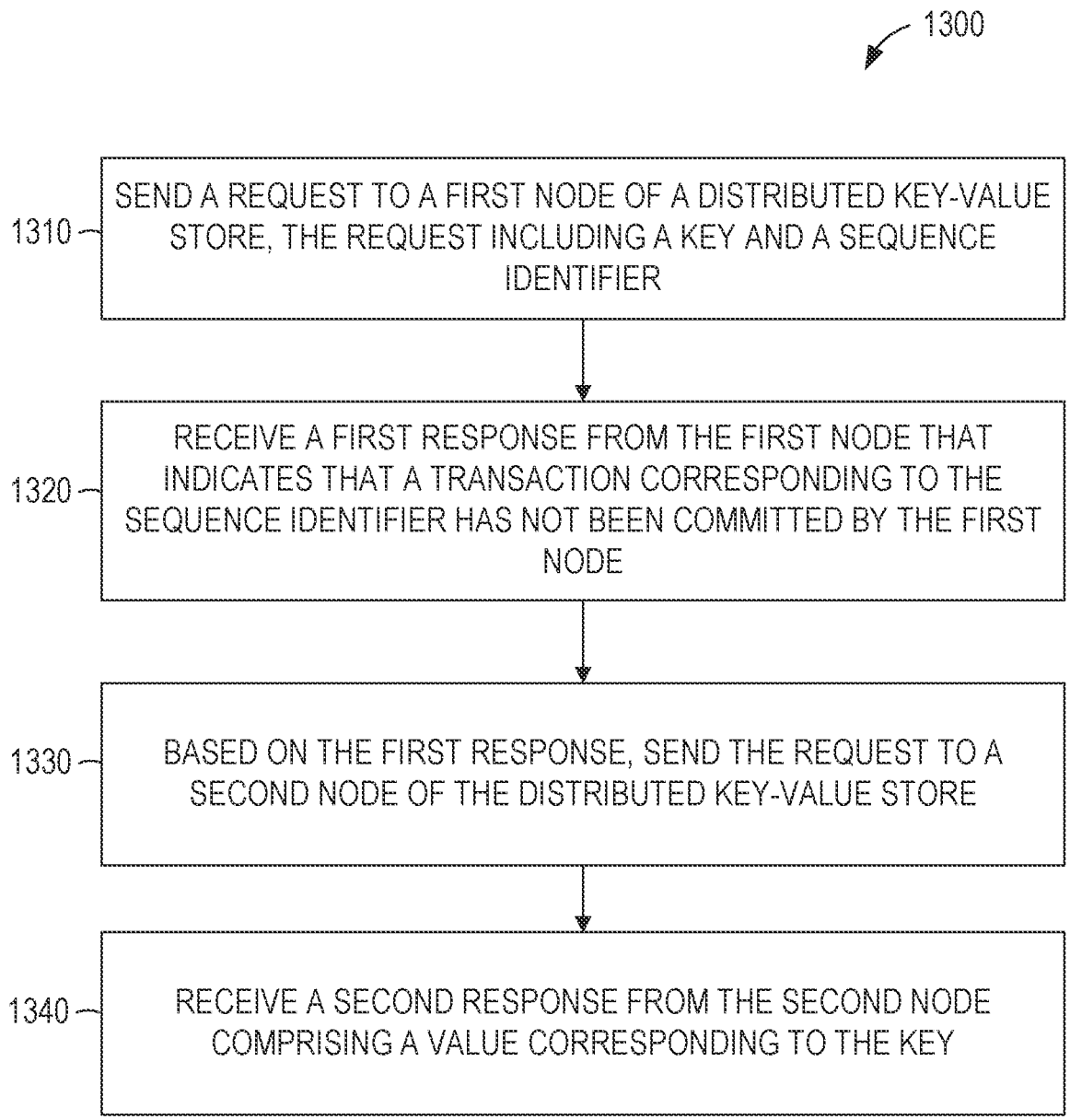
FIG. 13 is a flow diagram illustrating operations by a read client of a replicated key-value store in a method of using a free world replication protocol, according to some example embodiments.

FIG. 13 is a flow diagram illustrating operations by a read client of a replicated key-value store in a method 1300 of using a free world replication protocol, according to some example embodiments. The method 1300 includes operations 1310, 1320, 1330, and 1340. By way of example and not limitation, the method 1300 is described as being performed by the systems, modules, and databases of FIGS. 1-3.

In operation 1310, a read client (e.g., the device 160B of FIG. 1) sends a request to a first node (e.g., the node 120) of a distributed key-value store, the request including a key and a sequence identifier. The key identifies the value being requested by the read client. The sequence identifier identifies the last sent quorum received identifier.

In operation 1320, the read client receives a first response from the first node that indicates that a transaction corresponding to the sequence identifier has not been committed by the first node. Since the first node has not committed the transaction corresponding to the sequence identifier, the state of the key-value store at the first node is not the same as the state expected by the read client. Accordingly, strong consistency is not achieved if the read client receives the value from the first node.

In operation 1330, based on the first response, the read client sends the request to a second node of the distributed key-value store. If the second node also had not yet committed the transaction corresponding to the sequence identifier, the read client would repeat operation 1330 by sending the request to a third node. Since a quorum of nodes has already committed the transaction corresponding to the sequence identifier, repetition of the operation 1330 will be performed a finite number of times.

In operation 1340, the read client receives a second response from the second node comprising a value corresponding to the key. In this case, the second node had already committed the transaction corresponding to the sequence identifier included in the request, and thus responded with the requested value.

The methods and techniques disclosed herein improve the functioning of computers in a distributed key-value store. In prior-art systems, a write client communicated with a single node of the distributed key-value store and relied on that node to transmit data to other nodes. By contrast, by using the systems and methods described herein, the time from the initial write to the commit of the data to the distributed key-value store is reduced by relying on the write client to perform the initial transmission of a transaction to multiple nodes of the distributed key-value store. The technical consideration of the teachings provided herein provides an efficient solution to transcend the inefficiencies of the prior art.

Specific applications of the methods and systems described herein include block-based cloud storage, key/value stores without compare and commit operations, and some key/value stores with compare and commit operations. Block-based cloud storage has only one writeable client and one or more readable clients. Block-based cloud storage is similar to a key/value store where the key is the logical block address (LBA) and the value is the data of the block. So long as only one writeable client is used, no transactions will be rejected due to conflicts. In key/value stores without compare and commit operations, multiple clients can simultaneously write to the nodes without causing an inconsistent state and no transactions will be rejected due to conflicts. In key/value stores with compare and commit operations, some transactions will be rejected due to conflicting with other transactions when multiple writeable clients are used.

In block-based cloud storage, a read or write operation takes one round trip time (RTT) to execute. An RTT is the time to send a request from one device and receive a response at the device. Since each client device accesses one or more nodes and receives the response directly from that node, one RTT is taken. There is only one writeable node in the block-based cloud storage implementation, so no conflicting writes are possible and strong consistency results.

One RTT is also used for a read or write operation in a key/value store without compare and commit operations. Conflicting write operations may be received from different writeable clients, causing read operations to resolve differently depending on which node is read from. However, using the methods described herein, eventual consistency will result, without causing delays on the operations.

In a key/value store with compare and commit operations, 1.5 RTT is used per operation. Conflicting write operations may be received from different writeable clients, including conditional write operations, causing read operations to resolve differently depending on which node is read from. Further, some transactions will be rejected due to conflicting transactions being resolved first. The response time will be delayed to allow the resolution of conflicts, with an average of 0.5 RTT per transaction delay. However, using the methods described herein, eventual consistency will result, without causing delays on the operations.

By comparison, existing Raft replication systems have the client communicate to a Raft leader node which broadcasts the data to the replication nodes which acknowledge the data and only then does the leader node acknowledge the client communication, so the write time is 2.0 RTT. Reading from a replica node is 1.0 RTT, but could provide out-of-date data, so the Raft consistency is eventual consistency, not strong consistency.

As another example, existing Epaxos replication systems use a more complex protocol that takes 3.0 RTT for non-conflicting transactions, but results in strong consistency, so any read will always give the current state of the data.

When these effects are considered in aggregate, one or more of the methodologies described herein may obviate a need for certain efforts or resources that otherwise would be involved in performing transactions in a distributed key-value store. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Certain embodiments are described herein as including logic or a number of components, modules, or mechanisms. Modules may constitute either software modules (e.g., code embodied on a non-transitory machine-readable medium) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, in computer hardware, firmware, or software, or in combinations of them. Example embodiments may be implemented using a computer program product (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method by a first node associated with a distributed key-value store, the method comprising:
   receiving, at the first node associated with the distributed key-value store, a first message from a write client device requesting writing of a first transaction to the distributed key-value store, the first message comprising a sequence identifier associated with the first transaction;
   transmitting, by the first node, to a plurality of nodes associated with the distributed key-value store, a second message comprising the sequence identifier associated with the first transaction;
   receiving, by the first node, one or more replies indicating receipt of the first message comprising the sequence identifier by one or more nodes of the plurality of nodes; and
   writing the first transaction to the distributed key-value store based at least in part on receiving the one or more replies.

2. The method of claim 1, wherein transmitting the second message further comprises:
   transmitting the second message based at least in part on determining, by the first node, that the first transaction does not conflict with a second transaction pending for writing to the distributed key-value store.

3. The method of claim 2, further comprising:
   identifying that the sequence identifier associated with the first transaction differs from a second sequence identifier associated with the second transaction in the distributed key-value store to determine that the first transaction does not to conflict with the second transaction.

4. The method of claim 1, further comprising:
   receiving, at the first node associated with the distributed key-value store, an additional message from the write client device requesting writing of an additional transaction to the distributed key-value store, the additional message comprising a second sequence identifier associated with the additional transaction;
   determining, by the first node, that the additional transaction conflicts with a second transaction pending for writing to the distributed key-value store based at least in part on the second transaction being associated with the second sequence identifier; and
   transmitting, to the write client device, a message indicating the second sequence identifier has already been used.

5. The method of claim 1, wherein writing the first transaction to the distributed key-value store comprises:
   writing the first transaction to the distributed key-value store based at least in part on a number of the one or more replies satisfying a quorum.

6. The method of claim 1, further comprising:
   receiving, from a server device associated with the distributed key-value store, an indication that the first transaction is valid, wherein the first transaction is written to the distributed key-value store based at least in part on receiving the indication.

7. The method of claim 1, further comprising:
   receiving, from a server device associated with the distributed key-value store, an indication of the sequence identifier and a list of sequence identifiers for invalid transactions.

8. The method of claim 1, further comprising:
   removing the first transaction from a memory list based at least in part on writing the first transaction to the distributed key-value store.

9. A system, comprising:
   one or more processors; and
   a non-transitory machine-readable storage medium coupled to the one or more processors, the non-transitory machine-readable storage medium including instructions that, when executed by the one or more processors, cause the one or more processors to perform operations comprising:
      receiving, at a first node associated with a distributed key-value store, a first message from a write client device requesting writing of a first transaction to the distributed key-value store, the first message comprising a sequence identifier associated with the first transaction;

transmitting, by the first node, to a plurality of nodes associated with the distributed key-value store, a second message comprising the sequence identifier associated with the first transaction;

receiving, by the first node, one or more replies indicating receipt of the first message comprising the sequence identifier by one or more nodes of the plurality of nodes; and writing the first transaction to the distributed key-value store based at least in part on receiving the one or more replies.

10. The system of claim 9, wherein the operations for transmitting the second message further comprise:

transmitting the second message based at least in part on determining, by the first node, that the first transaction does not conflict with a second transaction pending for writing to the distributed key-value store.

11. The system of claim 10, the operations further comprising:

identifying that the sequence identifier associated with the first transaction differs from a second sequence identifier associated with the second transaction in the distributed key-value store to determine that the first transaction does not to conflict with the second transaction.

12. The system of claim 9, the operations further comprising:

receiving, at the first node associated with the distributed key-value store, an additional message from the write client device requesting writing of an additional transaction to the distributed key-value store, the additional message comprising a second sequence identifier associated with the additional transaction;

determining, by the first node, that the additional transaction conflicts with a second transaction pending for writing to the distributed key-value store based at least in part on the second transaction being associated with the second sequence identifier; and transmitting, to the write client device, a message indicating the second sequence identifier has already been used.

13. The system of claim 9, wherein the operations for writing the first transaction to the distributed key-value store comprise:

writing the first transaction to the distributed key-value store based at least in part on a number of the one or more replies satisfying a quorum.

14. The system of claim 9, the operations further comprising:

receiving, from a server device associated with the distributed key-value store, an indication that the first transaction is valid, wherein the first transaction is written to the distributed key-value store based at least in part on receiving the indication.

15. The system of claim 9, the operations further comprising:

receiving, from a server device associated with the distributed key-value store, an indication of the sequence identifier and a list of sequence identifiers for invalid transactions.

16. The system of claim 9, the operations further comprising:

removing the first transaction from a memory list based at least in part on writing the first transaction to the distributed key-value store.

17. A non-transitory machine-readable storage medium comprising processor executable instructions that, when executed by a processor of a machine, cause the machine to perform operations comprising:

receiving, at a first node associated with a distributed key-value store, a first message from a write client device requesting writing of a first transaction to the distributed key-value store, the first message comprising a sequence identifier associated with the first transaction;

transmitting, by the first node, to a plurality of nodes associated with the distributed key-value store, a second message comprising the sequence identifier associated with the first transaction;

receiving, by the first node, one or more replies indicating receipt of the first message comprising the sequence identifier by one or more nodes of the plurality of nodes; and writing the first transaction to the distributed key-value store based at least in part on receiving the one or more replies.

18. The non-transitory machine-readable storage medium of claim 17, wherein the operations for transmitting the second message further comprise:

transmitting the second message based at least in part on determining, by the first node, that the first transaction does not conflict with a second transaction pending for writing to the distributed key-value store.

19. The non-transitory machine-readable storage medium of claim 17, wherein the operations further comprise:

receiving, at the first node associated with the distributed key-value store, an additional message from the write client device requesting writing of an additional transaction to the distributed key-value store, the additional message comprising a second sequence identifier associated with the additional transaction;

determining, by the first node, that the additional transaction conflicts with a second transaction pending for writing to the distributed key-value store based at least in part on the second transaction being associated with the second sequence identifier; and transmitting, to the write client device, a message indicating the second sequence identifier has already been used.

20. The non-transitory machine-readable storage medium of claim 17, wherein the operations for writing the first transaction to the distributed key-value store comprise:

writing the first transaction to the distributed key-value store based at least in part on a number of the one or more replies satisfying a quorum.

\* \* \* \* \*